US012362563B2

(12) United States Patent
Ziminsky et al.

(10) Patent No.: US 12,362,563 B2
(45) Date of Patent: Jul. 15, 2025

(54) POWER PLANT HAVING A FLEXIBLE FIRM SKID

(71) Applicant: GE Infrastructure Technology LLC, Greenville, SC (US)

(72) Inventors: Willy Steve Ziminsky, Greenville, SC (US); Brock McLaren Wilson, Huntsville, AL (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 47 days.

(21) Appl. No.: 18/455,898

(22) Filed: Aug. 25, 2023

(65) Prior Publication Data
US 2025/0070554 A1 Feb. 27, 2025

(51) Int. Cl.
*H02J 3/14* (2006.01)
*H02J 3/38* (2006.01)
(Continued)

(52) U.S. Cl.
CPC ............ *H02J 3/14* (2013.01); *H02J 3/381* (2013.01); *H02J 3/46* (2013.01); *H02J 11/00* (2013.01);
(Continued)

(58) Field of Classification Search
CPC .......... H02J 11/00; H02J 2310/18; H02J 2310/50–58; H02J 3/008;
(Continued)

(56) References Cited

U.S. PATENT DOCUMENTS 8,146,374 B1   4/2012   Zien
9,160,175 B2  10/2015   Cservolgyi et al.
(Continued)

FOREIGN PATENT DOCUMENTS

CN    115760400 A   3/2023
EP      3738014 A4  1/2022
KR   20230000865 A  1/2023

OTHER PUBLICATIONS

Kordkheili et al., On-Site Power Generation for Data Centers, Sustainable Digital Infrastructure Alliance (SDIA), Integrating Data Centers with Low Carbon Energy Assets, 2021, 12 Pages. Retrieved May 18, 2023 from Webpage: https://1.sdialliance.org/hubfs/On-site%20Power%20Generation%20for%20Data%20Centers%20-%206.pdf?hsCtaTracking=d7ff7c45-88d9-44c0-aeab-6899fd267d0a%7Ca451fa94-0a64-47dc-a7ab-03fccd786c58.
(Continued)

*Primary Examiner* — Rexford N Barnie
*Assistant Examiner* — David A Shiao
(74) *Attorney, Agent, or Firm* — Dority & Manning, P.A.

(57) ABSTRACT

A method of operating a power plant is provided. The method includes generating, with the one or more power generators, a total plant power. The method further includes supplying, with a back up power source, a backup power output. The method further includes providing a first portion of the total plant power to one or more auxiliary devices to meet an auxiliary demand. The method further includes providing at least one of a second portion of the total plant power and the backup power output to the flexible firm skid to meet the flexible firm demand. The method further includes providing a third portion of the total plant power to a power grid outside of the power plant to meet a grid demand.

17 Claims, 6 Drawing Sheets

(51) Int. Cl.
*H02J 3/46* (2006.01)
*H02J 11/00* (2006.01)
*H02J 13/00* (2006.01)

(52) U.S. Cl.
CPC ..... *H02J 13/00002* (2020.01); *H02J 2300/10* (2020.01); *H02J 2300/20* (2020.01); *H02J 2310/18* (2020.01)

(58) Field of Classification Search
CPC .......... H02J 3/14–144; H02J 13/00034; H02J 2300/10; G06Q 50/06
See application file for complete search history.

(56) References Cited

U.S. PATENT DOCUMENTS

| | | |
|---|---|---|
| 10,110,003 B2 | 10/2018 | Stalker |
| 10,287,988 B2 | 5/2019 | Asati et al. |
| 10,367,353 B1 | 7/2019 | McNamara et al. |
| 10,444,818 B1 | 10/2019 | McNamara et al. |
| 10,452,127 B1 | 10/2019 | McNamara et al. |
| 10,608,433 B1 | 3/2020 | McNamara et al. |
| 10,618,427 B1 | 4/2020 | McNamara et al. |
| 10,626,817 B1 | 4/2020 | Piche et al. |
| 10,857,899 B1 | 12/2020 | McNamara et al. |
| 10,873,211 B2 | 12/2020 | McNamara et al. |
| 10,910,873 B2 | 2/2021 | Bonachea |
| 11,016,456 B2 | 5/2021 | Henson et al. |
| 11,016,458 B2 | 5/2021 | McNamara et al. |
| 11,016,553 B2 | 5/2021 | McNamara et al. |
| 11,025,060 B2 | 6/2021 | McNamara et al. |
| 11,031,783 B2 | 6/2021 | McNamara et al. |
| 11,031,787 B2 | 6/2021 | McNamara et al. |
| 11,031,813 B2 | 6/2021 | McNamara et al. |
| 11,042,948 B1 | 6/2021 | McNamara et al. |
| 11,128,165 B2 | 9/2021 | McNamara et al. |
| 11,221,597 B2 | 1/2022 | Dempster |
| 11,256,320 B2 | 2/2022 | McNamara et al. |
| 11,275,427 B2 | 3/2022 | McNamara et al. |
| 11,283,261 B2 | 3/2022 | McNamara et al. |
| 11,342,746 B2 | 5/2022 | McNamara et al. |
| 11,397,999 B2 | 7/2022 | McNamara et al. |
| 11,431,195 B2 | 8/2022 | McNamara et al. |
| 11,437,821 B2 | 9/2022 | Cavness et al. |
| 11,451,059 B2 | 9/2022 | Cavness et al. |
| 11,537,183 B2 | 12/2022 | Lewis et al. |
| 11,574,372 B2 | 2/2023 | Barbour |
| 11,581,734 B2 | 2/2023 | McNamara et al. |
| 11,592,886 B2 | 2/2023 | Marks et al. |
| 11,594,888 B2 | 2/2023 | McNamara et al. |
| 11,611,219 B2 | 3/2023 | McNamara et al. |
| 2008/0018175 A1 | 1/2008 | McNamara et al. |
| 2009/0078401 A1 | 3/2009 | Cichanowicz |
| 2013/0328395 A1 | 12/2013 | Krizman et al. |
| 2014/0044261 A1 | 2/2014 | Massimo |
| 2015/0261240 A1* | 9/2015 | Mokhtari .................. H02J 3/46 713/176 |
| 2018/0145511 A1* | 5/2018 | Biellmann ................ F01K 7/16 |
| 2019/0339756 A1* | 11/2019 | Lewis ........................ G06F 1/30 |
| 2020/0040272 A1* | 2/2020 | Cavness .................... F02C 3/22 |
| 2020/0359572 A1 | 11/2020 | Henson et al. |
| 2021/0010385 A1 | 1/2021 | Spears |
| 2021/0027223 A1 | 1/2021 | Koide |
| 2021/0035242 A1* | 2/2021 | McNamara ......... G06F 11/3495 |
| 2021/0036547 A1 | 2/2021 | McNamara et al. |
| 2021/0092875 A1 | 3/2021 | Hellmann-Regen |
| 2021/0101499 A1 | 4/2021 | McNamara et al. |
| 2021/0288496 A1 | 9/2021 | McNamara et al. |
| 2021/0296928 A1 | 9/2021 | McNamara et al. |
| 2021/0312574 A1 | 10/2021 | McNamara et al. |
| 2022/0050714 A1 | 2/2022 | Grimshaw et al. |
| 2022/0065162 A1 | 3/2022 | Hunt et al. |
| 2022/0085603 A1 | 3/2022 | McNamara et al. |
| 2022/0171449 A1 | 6/2022 | McNamara et al. |
| 2022/0197363 A1 | 6/2022 | McNamara et al. |
| 2022/0271563 A1 | 8/2022 | Hug |
| 2022/0278531 A1* | 9/2022 | Ough ........................ H02J 3/32 |
| 2022/0294219 A1 | 9/2022 | McNamara et al. |
| 2022/0300394 A1 | 9/2022 | Webber |
| 2022/0335543 A1 | 10/2022 | Roston et al. |
| 2022/0407350 A1 | 12/2022 | McNamara et al. |
| 2023/0121669 A1 | 4/2023 | McNamara et al. |
| 2023/0387682 A1* | 11/2023 | Tateiwa ............ H02J 13/00002 |
| 2024/0162746 A1* | 5/2024 | Billingsley, Jr. ........ H02J 3/381 |

OTHER PUBLICATIONS

European Search Report Corresponding to U.S. Appl. No. 24/191,974 on Feb. 21, 2025.

* cited by examiner

POWER PLANT HAVING A FLEXIBLE FIRM SKID

FIELD

The present disclosure relates generally to a power plant having one or more power generators and a flexible firm skid configured to selectively generate a flexible firm demand.

BACKGROUND

In electric power systems, a number of participants or power plants generate electricity that is then distributed over common transmission lines to residential and commercial customers. As will be appreciated, thermal power generators, such as gas turbines, steam turbines, and combined-cycle plants and distributed generation, are relied on to generate a significant portion of the power consumers and industry require. Each of the power plants within such systems include one or more power generators, and each of these units typically includes a control system that controls operation, and, in the case of power plants having more than one generating unit, the performance of the power plant as a whole.

Given the complexity of modern power plants, particularly those having multiple power generators, and the market within which it competes, power plant operators continued to struggle to maximize economic return. For example, intraday changes in the external factors (such as weather conditions, or grid demand changes), starting/stopping the thermal generators (e.g., a gas turbine) in response to these external factors, and operating the thermal generators outside of a maximum efficiency range, will lead to inefficient operation thereby reducing economic returns. To compensate for this type of variability, power plant operators often become overly conservative in planning for future operation, which results in underutilized power generators. Other times, plant operators are forced to operate units inefficiently to satisfy over-commitments.

As such, improved methods and systems for controlling power plant operation are desired and would be appreciated in the art.

BRIEF DESCRIPTION

Aspects and advantages of the power plants and methods of operation in accordance with the present disclosure will be set forth in part in the following description, or may be obvious from the description, or may be learned through practice of the technology.

In accordance with one embodiment, a method of operating a power plant is provided. The method includes generating, with the one or more power generators, a total plant power. The method further includes supplying, with a back up power source, a backup power output. The method further includes providing a first portion of the total plant power to one or more auxiliary devices to meet an auxiliary demand. The auxiliary demand being generated through operation of the one or more auxiliary devices. The one or more auxiliary devices being one of thermally, fluidly, or mechanically coupled to the one or more power generators. The method further includes providing at least one of a second portion of the total plant power and the backup power output to the flexible firm skid to meet the flexible firm demand. The flexible firm demand being generated through operation of the flexible firm skid. The method further includes providing a third portion of the total plant power to a power grid outside of the power plant to meet a grid demand.

In accordance with another embodiment, a power plant is provided. The power plant includes one or more power generators electrically connected to a power grid. The power plant further includes one or more auxiliary devices that is at least one of mechanically, thermally, or fluidly coupled to the one or more power generators. The one or more auxiliary devices being configured to generate an auxiliary demand. The power plant further includes a flexible firm skid disposed within the power plant. The flexible firm skid includes a containerized demand sink and a back up power source electrically connected to the containerized demand sink and the one or more power generators. The flexible firm skid being configured to generate a flexible firm demand. The power plant further includes a controller that is operably connected to the gas turbine and the flexible firm skid. The controller includes memory and one or more processors. The memory storing instructions that when executed by the one or more processors cause the power plant to perform one or more operations. The operations include generating, with the one or more power generators, a total plant power. The operations further includes supplying, with the back up power source, a backup power output. The operations further include providing a first portion of the total plant power to one or more auxiliary devices to meet an auxiliary demand. The auxiliary demand being generated through operation of the one or more auxiliary devices. The one or more auxiliary devices being one of thermally, fluidly, or mechanically coupled to the one or more power generators. The operations further include providing at least one of a second portion of the total plant power and the backup power output to the flexible firm skid to meet the flexible firm demand. The flexible firm demand being generated through operation of the flexible firm skid. The operations further include providing a third portion of the total plant power to a power grid outside of the power plant to meet a grid demand.

These and other features, aspects and advantages of the present power plants and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present power plants and methods, including the best mode of making and using the present systems and methods, directed to one of ordinary skill in the art, is set forth in the specification, which makes reference to the appended figures, in which.

DETAILED DESCRIPTION

Figure 1:
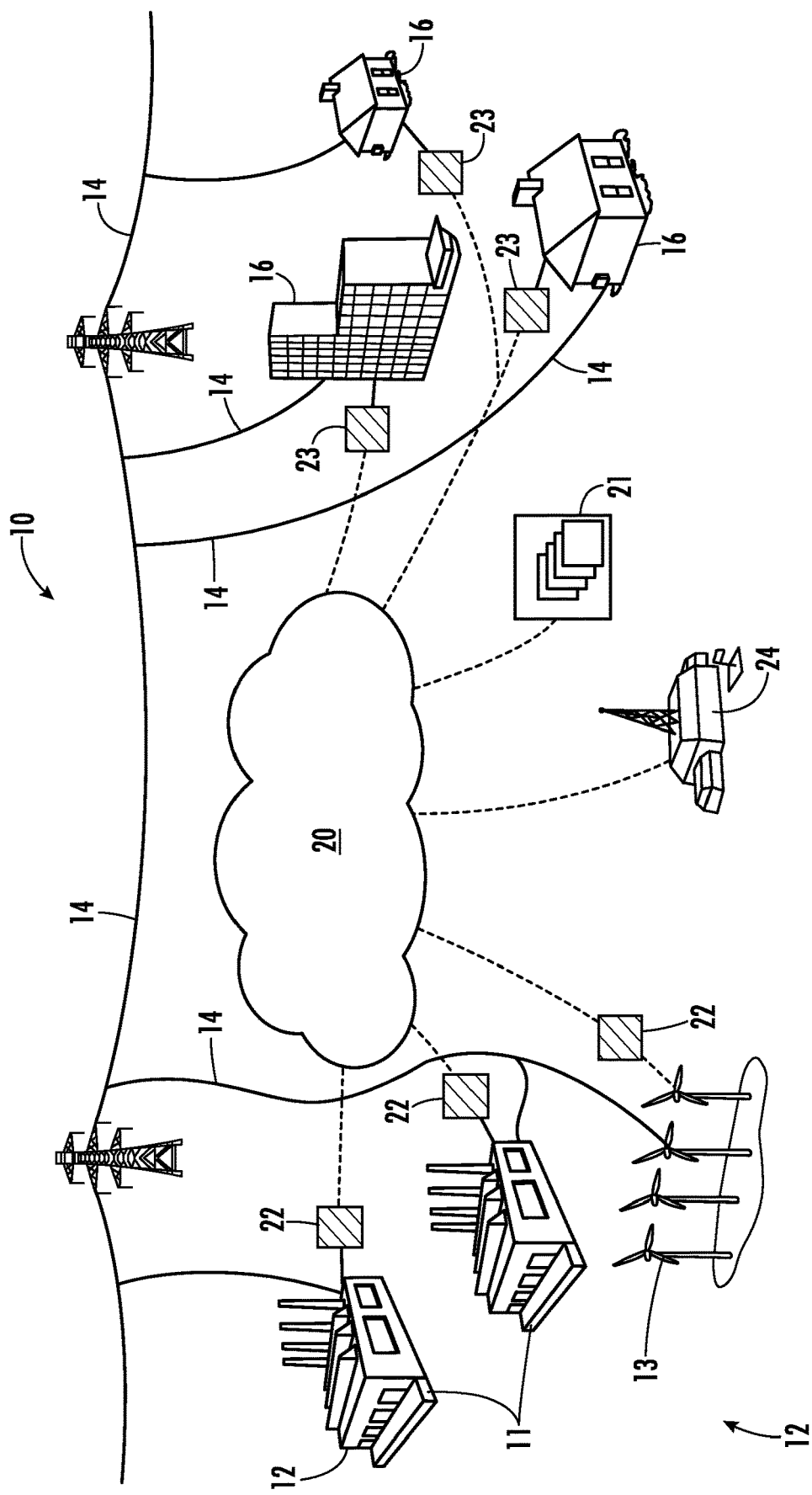
FIG. 1 shows a schematic diagram of a power system according to aspects of the present disclosure or within which embodiments of the present disclosure may be used.

Reference now will be made in detail to embodiments of the present power plants and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about." "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

As used herein, "demand" or "power demand" when used in reference to a device, refers to the rate at which electrical energy is consumed when operating the device at a given moment in time or over a specific time period.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 illustrates a schematic representation of a power system 10 illustrating an exemplary power system environment within which embodiments of the present disclosure may operate. Power system 10 may include one or more power plants 12 having one or more power generators for generating electrical power. Such power plants 12 may include a thermal power generator 11, such as a gas turbine and/or steam turbine, and/or a renewable power generator 13, such as a wind turbine or solar panel. Within power system 10, common transmission lines 14 connect the power generators 11, 13 to one or more loads or customers 16, which, for example, may include municipalities, residential, and industrial customers. Transmission lines 14 represent the distribution network or power grid of power system 10 and may include multiple sections or substations as appropriate.

Power system 10 also includes control systems or controllers that manage or control the operation of several of the components contained therein. For example, a plant controller 22 may control the operation of power plant 12 and the power generators included therewithin, while load controllers 23 may control the manner or timing of power purchases by customers 16. Power system 10 also includes a central authority, or dispatch authority 24, that manages the dispatch process by which load commitments are distributed among power plants 12 for satisfying customer demand. Controllers 22,23 may be connected via communication lines to communication network 20 over which data is exchanged. Communication network 20 may be connected to or part of communications networks, such as the internet, private networks, or cloud networks. In addition, controllers 22,23 may receive information, data, and instructions from and/or send information, data, and instructions to data libraries and resources (or "data resources 21") through communication network 20. Controllers 22,23 also may store or house data repositories locally. Data resources 21 may include several types of data, including but not limited to market data, operational data, performance data, and ambient conditions data.

In operation, for example, the power plant 12 generates electricity via the power generators 11, 13 that is distributed over common transmission lines 14 for delivery to customers 16. Pursuant to a dispatch process, which is administered by dispatch authority 24, power plants may compete against each other to determine how each will be engaged to satisfy the anticipated load requirements of customers 16 during a future generating period. During the dispatch process, operators of power plants 12 generate offer curves that include generating cost for the future generating period. The offer curves represent bids by power plants 12 for the future generating period, and typically include an incremental variable cost curve or some other suitable indication of variable generating expense, which, for example, may be expressed in dollars per megawatt-hour versus output in megawatts. Dispatch authority 24 then uses the received offer curves to divide the anticipate load requirements for the future generating period among power plants 12. For example, dispatch authority 24 may employ a competitive process known as economic dispatch to determine the level at which to engage each power plant 12 that most efficiently satisfies the predicted load requirements of power system 10. In doing this, a primary objective of the dispatch authority 24 is to find the lowest generating cost that satisfies anticipated customer demand. Once this is done, dispatch authority 24 issues a commitment schedule to power plants 12 that specifically describes the manner in which each will be engaged over the future generating period.

Once the commitment schedule is communicated to power plants 12, the objective of each is to generate the committed output in a manner that maximizes economic return. As will be appreciated, given the growing complexity of the modern power plant, this objective is becoming particularly challenging. This complexity is the product of many factors.

For example, power plants now typically include many different power generators of varying types (such as the thermal power generators 11 and the renewable power generators 13), and these enable numerous alternative generating configurations, with each of these alternatives attending its own set of economic considerations. Each of these generators 11, 13 also must be maintained according to its own maintenance schedule that requires regular outages that must be carefully planned so to not unnecessarily impact plant operations.

In addition, the power industry is a heavily regulated one, with numerous laws and regulations affecting how power plants can be operated. Finally, of course, fluctuating market conditions make short- and long-term profitability a moving target. While conventional control systems may be proficient at addressing some these issues—for example, executing scheduling algorithms by which fuel flow, inlet guide vanes settings, and other inputs are adjusted—the actual output and efficiency of a power plant is regularly impacted by external factors, such as variable ambient conditions or unplanned outages, that cannot be fully anticipated. As will be appreciated, the growing complexity of power plants and the variability of operating conditions make it difficult to predict and control performance, which often results in inefficient operation. Further, conventional control systems are often inadequate because they do not fully leverage the growing data-intensive aspects of the industrial world. Specifically, current control systems have been unsuccessful at realizing the level of industrial optimization that the growing availability of operational data make possible, and this failure results in power plants and power generators being operated inefficiently and without maximizing economic return.

Further, performance degradation is another factor that is difficult to quantify, but one that significantly impacts plant operations and economic return. More specifically, because the performance of the power generators and machinery of power plants degrades over time, it must be accounted for when dispatching the units and understood in assessing the cost-effectiveness of the plant. However, the rate at which a gas turbine degrades varies according to many factors, including hours of operation, load, operating configuration, transient operation, and number of starts. Yet many of these factors are interrelated and affect degradation in ways that are not fully understood. As an example, hours-based life in a gas turbine may be prolonged by reducing firing temperatures, however, this alternative reduces efficiency, which increases fuel costs. Conversely, increasing the firing temperature increases efficiency, but shortens component life and increases costs for maintenance and part replacement. In a similar way, decisions related to turn down, shut down, and rapid ramping impact life consumption of machine components and fuel costs. Further, grid compliance and dispatching may be adversely impacted by controlling the plant's power generators in an overly-static manner, i.e., through the use of static control profiles, such as heat rate curves, derived from periodic performance tests. Between such updates, unit performance may have degraded to the point where the control profiles are obsolete.

To compensate for all this variability, power plant operators often become overly conservative in planning for future generating periods, which results in bidding practices that make their units less competitive and underutilized capacity. To do otherwise risks bidding the plant beyond its current performance capabilities, which may force an operator to operate units inefficiently to satisfy load commitments. Thus, because of the many complex and interrelated factors, operators still struggle to manage life cycle costs and economic return associated the power generators of power plants. The extent to which these factors can be better understood and the related trade-offs more effectively balanced can directly translate into improved economic performance of the power plant. That is, without understanding and identifying short-term inefficiencies and long-term deterioration, conventional power plant control systems must rely on being frequently retuned, which can be a costly result, or being bid and operated conservatively, which often negatively impacts the cost-effectiveness of the plant.

In sum, these issues generally result in industrial assets, such as power plants and power generators, being operated in ways that fail to maximize efficiency and economic return. With reference now to the following figures, embodiments of the present disclosure will be disclosed that address one or more aspects related to these ongoing problems.

Figure 2:
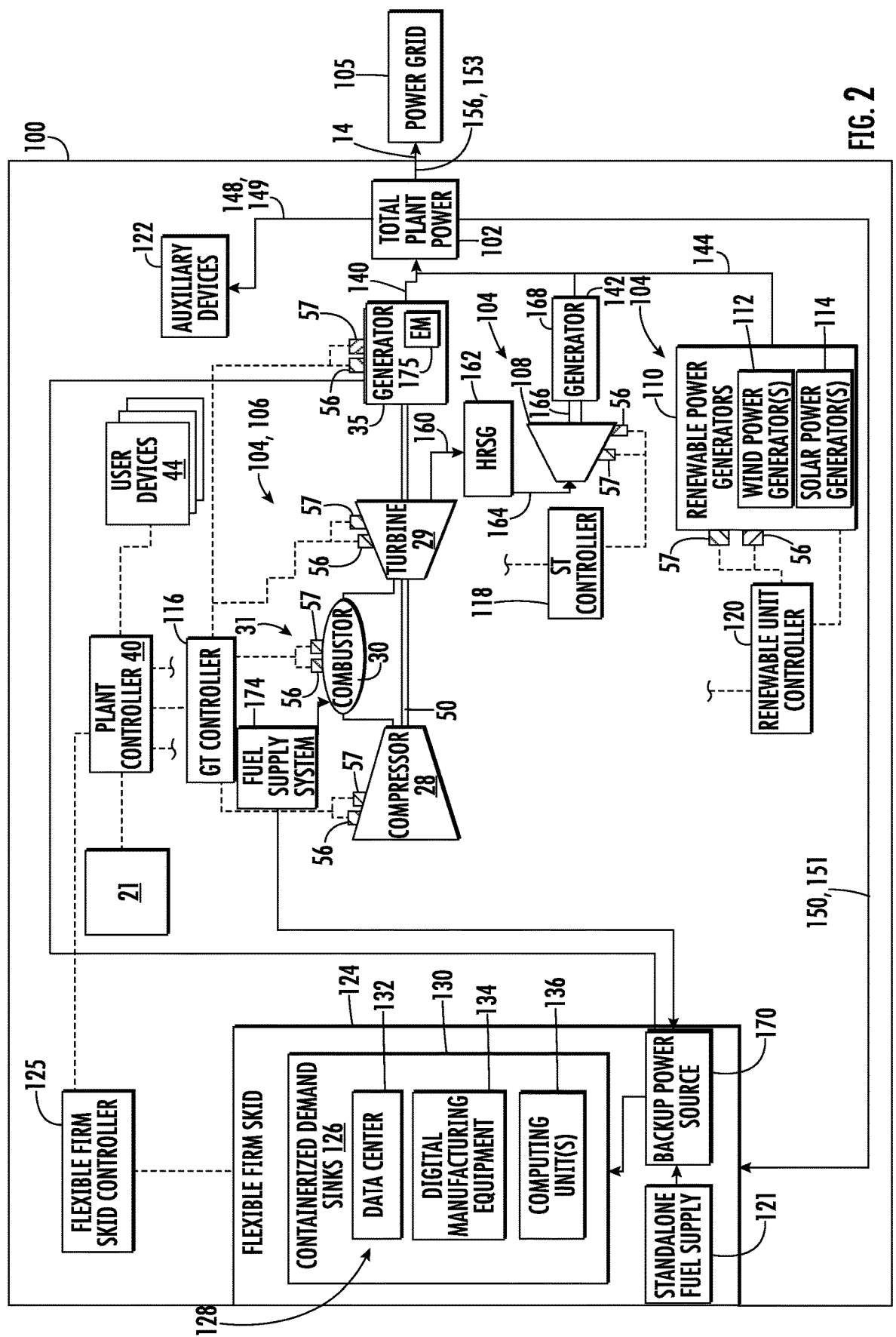
FIG. 2 illustrates a schematic diagram of a power plant in accordance with embodiments of the present disclosure.

FIG. 2 provides a schematic illustration of an exemplary power plant 100 configured to generate a total plant power 102 with one or more power generators 104 and supply at least a portion of such power to a power grid 105 (e.g., via a transmission lines 14), in accordance with embodiments of the present disclosure. Each of the power plants 12 in FIG. 1 may be configured the same or different as the power plant 100 shown in FIG. 2.

As an exemplary type of power generator 104, the power plant 100 is shown as including a combustion or gas turbine 106, however it should be appreciated that it may include other power generators 104 of varying types. For example, as shown, the one or more power generators 104 may include a steam turbine 108 and renewable power generators 110. The renewable power generators 110 may include wind power generators 112 (e.g., wind turbines) and/or solar power generators 114 (e.g., solar panels).

The gas turbine 106 may include a compressor 28 coupled, e.g., by a shaft 50, to a downstream turbine section or turbine 29, with a combustor 30 of a combustion section 31 being positioned therebetween. In one example of operation, the rotation of rotor blades within compressor 28 compresses a flow of air. Within combustor 30, energy is released when the compressed air is mixed with a fuel and ignited, with the resulting flow of hot gases, or working fluid, being directed over rotor blades within turbine 29, which induce the shaft 50 to rotate. In this way, the energy within the working fluid is transformed into rotating the shaft, which then, for example, may be used to drive the coils of a generator 35 to produce electricity. For example, when operating, the gas turbine 106 may produce a gas turbine power output 140, which may form a portion of the total plant power 102.

The gas turbine 106 may produce heated exhaust gases 160, which may be provided to a heat recovery steam generator (HRSG) 162 to produce steam 164. The steam 164 may expand and release heat energy within the steam turbine 108 to rotate a shaft 166 that couples the steam turbine 108 to a generator 168. The generator 168 may convert the mechanical rotational energy to electrical energy, or a steam turbine power output 142, which may form a portion of the total plant power 102.

Power plant 100 may include any number of subsystems, components, power generators 104, or industrial assets, each of which may be connected to computer-implemented control systems and communication networks for the control and performance optimization pursuant to analytics, processes, and other functionality described herein. For example, within such control systems, operational data may be collected and provided electronically to computer-implemented analytics, data repositories, plant or unit controllers, cloud-based services, and/or user interfaces or input devices (or "user devices") so to enable a variety of functions. Such functions may include deriving control setpoints for operating an industrial asset, data storage/recall, generating graphical user interfaces, prompting/obtaining user input, decision support for long-term and short-term operations, automated control responses, and others, as may be provided herein. Thus, the networked computing systems, controllers, and related computing resources of FIG. 2 may send/receive electronic communications to/from each of the systems, subsystems, components, sensors, actuators, user devices, and/or other equipment within power plant 100 and included power generators 104, as well as manipulate control settings related thereto, in a manner consistent with functionality described herein, whether that functionality is explicitly stated or implicit given the appended claims, as would be understood by a person of ordinary skill in the art.

As shown, each of the power generators 104 may include a control system or controller, that monitors and controls operation. For example, the gas turbine 106 may be operably connected to a gas turbine controller 116 (or "GT controller"). The steam turbine 108 may be operably connected to a steam turbine controller 118 (or "ST controller"). The renewable power generators 110 may each be operably coupled to a renewable unit controller 120 (e.g., each of the renewable power generators 110 may be connected to the same controller or different controllers).

The controllers 116, 118, 120 fulfill a variety of control requirements as well as protecting against adverse or abnormal operating conditions. For example, the gas turbine controller 116 may perform many functions, including fuel, air and emissions control, sequencing of fuel for start-up, shut-down and cool-down, synchronization and voltage matching of generator 35, and monitoring gas turbine control and auxiliary functions, as may be described or implied herein. A plant controller 40 also may be provided that communicates with each of the controllers 116, 118, 120. Plant controller 40 generally controls aspects relating to the overall operation of power plant 100, such as management and distribution of the total plant power 102 between the assets within the power plant (such as the flexible firm skid and the auxiliary devices) and the power grid 105 outside of the power plant 100.

The controllers 116, 118, 120 and the plant controller 40—which also may be referenced herein collectively as "controllers"—each may include a computer system having digital processors or processing resources (or "processor") as well as machine-readable storage medium or memory capabilities (or "memory"). Alternatively, controllers 116, 118, 120 and plant controller 40 may be combined into a single controller having an integrated architecture. Controllers 116, 118, 120 and plant controller 40, and the computer system related to each, may connect to one or more user devices 44. User devices 44 may be configured to receive and send communications from/to any personnel associated with the operation of power plant 100 or power generators 104. User devices 44 may include any conventional device having a user interface, without limitation, including mobile devices, laptops, and other workstations, whether locally or remotely disposed relative to the location of power plant 100 or power generators 104.

Power generators 104 may be monitored by a variety of sensors that collect and transmit data to local and remote computer systems for analysis thereby, as well as control and operational feedback therefrom. For example, each of the power generators 104 may include multiple sensors 56 that are configured to monitor particular operational aspects of the power generator 104 to which they are operably connected by detecting or measuring operating conditions or parameters throughout the engine as it operates. For example, sensors 56 may include temperature sensors, pressure sensors, velocity sensors, flame detector sensors, valve position sensors, as well as any other conventional sensor anticipated given the functionality described herein. As used herein, the term "parameter" refers to measurable physical properties of operation which collectively may be used to define operating conditions within a system. Such operating parameters may include, without limitation, temperature, pressure, humidity, gas flow characteristics, ambient conditions, fuel characteristics, and other measurables, as may be described or implied by the functionality described herein.

Additionally, each of the power generators 104 may include several actuators 57 by which control of the power generators 104 is achieved. For example, actuators 57 may include electro-mechanical devices having variable setpoints or settings that allow for the manipulation of certain process inputs—herein "manipulated variables"—for the control of process outputs herein "controlled variables"—in accordance with a desired result or mode of operation. Thus, for example, commands generated by the GT controller 116 may cause one or more actuators 57 within gas turbine 106 to adjust valves between a fuel supply system and the combustor 30 to regulate flow level, fuel splits, or fuel type.

As will be appreciated, the computer systems of FIG. 2, such as controllers 116, 118, 120, execute code or software programs or applications (or, generally, "software") that are configured to control power generators 104 and/or power plant 100 according to a desired mode of operation or to maximize predefined performance objectives. Such control may be responsive to operational data supplied by sensors 56 and/or instructions received from user devices 44, and such control may be implemented via manipulating one or more actuators 57. In furtherance of this, user devices 44 may be accessed and used by plant managers, technicians, engineers, operators, energy traders, owners, and/or other stakeholders, as may be described or implied by any of the functionality provided herein. The software may include schedules, analytics, models, and algorithms for regulating any of the systems or subsystems described herein.

Controller 40 (and/or controllers 116, 118, and 120) may receive information, data, and instructions from and/or send information, data, and instructions to data resources 21. Data resources 21 may include any type of data implied by the functionality described herein. For example, data resources 21 may include, but not limited to the following types of data: market data, operational data, and ambient conditions data. Market data, for example, may include information on market conditions, such as energy sales price, fuel costs, labor costs, regulations, etc. Operational data, for example, may include information relating to the operating conditions of power plant 100, the one or more power generators 104, or related components. Such operational data may include temperature or pressure measurements, air flow rates, fuel flow rates, etc. within power generators 104 (such as the gas turbine 106). Ambient condition data, for example, may include information related to ambient conditions at power plant 100, such as ambient air temperature, humidity, and/or pressure. Market, operating, and ambient conditions data each may include historical records, present condition data, and/or data relating to forecasts. For example, data resources 21 may include present and forecast meteorological/climate information, present and forecast market conditions, usage, and performance history records about the operation of power plant 100 or power generators 104, and/or measured parameters regarding the operation of other similarly situated power plants or gas turbines, which may be defined as those having similar components and/or configurations. Other data, as may be described or implied by the functionality described herein, also may be stored and recalled from data resources 21 as needed.

In many embodiments, the power plant 100 may include one or more auxiliary devices 122 which may be operably coupled with the one or more power generators. For example, the one or more auxiliary devices 122 may be thermally, fluidly, or mechanically coupled to the one or more power generators 104. Particularly, the auxiliary devices 122 may operably couple with the gas turbine 106 (e.g., at least one of thermally, fluidly, or mechanically coupled with the gas turbine 106). The one or more auxiliary devices 122 may include pumps, fans, actuators (such as the actuators 57), sensors, (such as the sensors 56), valves, or other devices coupled to the gas turbine 106. The auxiliary devices 122 may generate an auxiliary demand (i.e., an auxiliary power demand) during operation thereof. The auxiliary devices may at least partially facilitate operation of the gas turbine 106. As such, the auxiliary devices 122 may only be operational, and thus only generate an auxiliary power demand, during operation of the gas turbine 106. The auxiliary devices may be the components of the gas turbine 106 that require electrical power for operation, and as such, the auxiliary power demand may be the amount of power required for operation of the gas turbine 106.

In exemplary embodiments, the power plant 100 may include a flexible firm skid 124. The flexible firm skid 124 may be disposed within the power plant 100 and may be configured to generate (e.g., selectively generate) a flexible firm demand (i.e., a flexible firm power demand). The flexible firm demand may be the amount of electrical power required for operation of the flexible firm skid 124 (i.e., consumed by the flexible firm skid 124 during operation thereof). The flexible firm skid 124 may not be mechanically, fluidly, or thermally coupled to the power generators 104 (such as the gas turbine 106) but may be disposed in close proximity thereto (such as within 500 meters, or such as within 350 meters, or such as within 200 meters, or such as within 100 meters). The flexible firm skid 124 may be disposed electrically upstream of the power grid 105 (e.g., electrically upstream of a first power substation and/or the customers 16, which may form a part of the power grid 105).

In many embodiments, as shown, the flexible firm skid 124 may include a containerized demand sink 126 having a digital asset 128 disposed within a housing 130. The housing 130 may be a movable structure or an immovable structure that surrounds and contains the digital asset(s). For example, in some embodiments, the housing 130 may be a shipping container, such as an 8 foot by 8.5 foot by 10 foot shipping container (which may be referred to as a "10 foot shipping container"), or such as an 8 foot by 8.5 foot by 20 foot shipping container (which may be referred to as a "20 foot shipping container"), or such as an 8 by 8.5 by 40 foot shipping container (which may be referred to as a "40 foot shipping container"). In other embodiments, the housing 130 may be an immovable structure, such as a warehouse or other permanent structure connected to the ground.

The flexible firm skid 124 may not be mechanically, thermally, or fluidly coupled to the one or more power generators 104. That is, the flexible firm skid 124 may operate independently from the one or more power generators 104, but the flexible firm skid 124 may be powered by the electrical energy generated by the one or more power generators 104. In this way, the flexible firm skid 124 may only be electrically connected to the one or more power generators 104.

The containerized demand sink 126 may include of a data center 132, digital factory equipment 134, and/or a computing unit 136. The data center 132 may include a plurality of servers (e.g., a computing device that provides services, data, or resources to other computers or clients within a network), networking equipment, cooling systems. The digital factory equipment 134 may include additive manufacturing machines, computer numerical control (CNC) machines, industrial robots, or other equipment.

In exemplary embodiments, the containerized demand sink 126 may include a computing unit (such as a plurality of computing units). Computing units 136 (such as cryptocurrency machines or miners) may be specialized computing system configured to perform complex mathematical calculations required to validate and secure transactions on a blockchain network. Particularly, the computing units 136 may each include a central processing unit (CPU), a graphics processing unit (GPU), an applications-specific integrated circuit (ASIC), a field programmable gate array (FPGA), RAM, a computer chassis, a motherboard, a power supply unit, one or more cooling systems (such as fans or liquid cooling systems), and local communications device (e.g., modems). The computing units 136 may serve the function of performing high load calculations, such as data mining, graphic rendering, machine learning, cryptocurrency mining, blockchain validation, distributed ledger processing, and/or distributed computation. The computing units could use secure hash algorithms such as SHA-0, SHA-1, SHA-2, and SHA-256 (most common in the blockchain space and what most coins use including various cryptocurrencies), and also SHA-512 (a more complex version of SHA-256 with greater theoretical security and ability to withstand brute force attacks), SHA-3, SHA3-256, SHA3-512.

In many embodiments, the flexible firm skid 124 may include a flexible firm skid controller 125, which may be in operable communication with the containerized demand sink 126. The flexible firm skid controller 125 may control and monitor operation of the flexible firm skid, including the digital assets 128. Additionally, the flexible firm skid controller 125 may be operably connected, and in communication with, the plant controller 40, such that control of the digital assets 128 may be based on signals received from the plant controller 40.

In exemplary embodiments, the flexible firm skid controller 125 may selectively operate all, or a portion of, the digital assets 128, thereby causing the flexible firm power demand to be selectively generated and scaled as necessary. For example, in embodiments where the digital assets 128 are a plurality of computing units 136, the flexible firm skid controller 125 may initiate operation of all, or a portion (e.g., such as between 0% and about 100%), of the computing units 136. For example, the flexible firm skid controller 125 may power on the computing units 136 and instruct the computing units 136 to begin performing high load power calculations (such as cryptocurrency mining), thereby generating a predetermined flexible firm demand, which may be met or satisfied by partitioning and supplying the total plant power 102.

The flexible firm demand may be both internally generated and internally met within the power plant 100. That is, the flexible firm demand may be generated by operating the digital assets 128 within the power plant 100, and the flexible firm demand may be internally met (or satisfied) by utilizing power generated by the one or more power generators 104. In this way, power or electricity supplied to the flexible firm skid 124 to meet the flexible firm demand does not travel through the power grid 105 but is rather supplied locally (i.e., within the power plant) via power generated by the one or more power generators 104. This allows the flexible firm demand to internally maintain and support at least a portion of the power output of certain power generators to maintain a maximum efficiency range of the power generator 104.

The power plant 100, and each of the one or more power generators 104, may operate in a maximum efficiency range at base load conditions. In such conditions, the power plant, and each of the one or more power generators, may generate a base load power output. For example, the power plant 100 may generate a power plant base load power output, the gas turbine 106 may generate a gas turbine base load power output, etc.

For example, the gas turbine 106 may operate within a maximum efficiency range at base load conditions (at which conditions a gas turbine base load power output is generated). Starting/stopping the gas turbine 106, operating below base load conditions (e.g., generating a power output that is less than the base load power output), and/or operating above the base load conditions (e.g., generating a power output that is greater than the base load power output) may cause the gas turbine 106 (and/or the entire power plant 100) to fall outside of the maximum efficiency range. In this way, while the grid demand may fluctuate, and the weather may change thereby adjusting the power output the renewable power generators 110, the flexible firm demand may be selectively generated (and scaled as necessary) to keep the gas turbine 106 (and the entire power plant 100) supported at base load conditions regardless of a magnitude of the grid demand and/or a magnitude of the renewable power generated (e.g., regardless of the weather conditions).

As one non-limiting example, if the renewable power generators 110 are producing a power output that is sufficient to satisfy the current grid demand (e.g., the weather conditions are sufficient to support this output), such that the gas turbine 106 is not needed or is needed to produce a level of power that is below the base load power output, the flexible firm skid 124 may operate the digital assets 128 to produce a flexible firm demand having a magnitude large enough to support operation of the gas turbine 106 (and/or the entire power plant) at base load conditions, thereby maintaining the maximum efficiency range. If, in this same example, the weather conditions change (e.g., the wind stops blowing or the sun stops shining), or the grid demand increases, such that the renewable power output is no longer sufficient to satisfy the grid demand, the flexible firm skid 124 may adjust an operation to reduce the flexible firm demand or entirely shut off, and the gas turbine 106 may continue to operate at base load conditions or ramp up from base load conditions to satisfy the grid demand and compensate for the decrease in renewable power output.

This prevents having to start/stop the gas turbine 106 based on the current grid demand and/or based on the weather conditions because the gas turbine power output may be either entirely or partially consumed by the flexible firm demand (which may be reduced, increased, or shut off within milliseconds). Additionally, this provides for a quicker grid response because adjusting the flexible firm demand by adjusting an operation of the flexible firm skid 124 may be done much faster than ramping up the gas turbine 106. For example, the gas turbine may ramp between 0% power output and about 100% power output at a power ramp rate of between about 1%/minute and about 15%/minute (or such as between about 8%/minute and about 12%/minute, or such as between about 5%/minute and about 10%/minute). Alternatively stated, the gas turbine may ramp between 0% power output and about 100% power output at a power ramp rate of between about 10 MW per minute (e.g., MW/min) and about 60 MW/minute. In other embodiments, the power ramp rate may be between about 10 MW/min to about 40 MW/min. In some embodiments, the power ramp rate may be between about 10 MW/min to about 30 MW/min, or between about 8% (MW/min) to 12% (MW/min) for gas turbines, or between about 20% (MW/min) to about 50% (MW/min) for aeroderivative gas turbines. In many embodiments the gas turbine 106 may include a maximum rated power output (e.g., the maximum power output of the gas turbine in MW/min), and the power ramp rate of the gas turbine may be between about 8% per minute of the maximum rated power output and about 12% per minute of the maximum rated power output.

The flexible firm demand, which may be scaled as necessary depending on how many of the computing units are operational, may be between about 1 MW and about 50 MW (or such as between about 10 MW and about 30 MW). The flexible firm demand may be adjusted (e.g., increased, decreased, or eliminated) within about 0.001 seconds and about 5 seconds by adjusting the number of operating computing units.

In many embodiments, the one or more power generators 104 may collectively produce a total plant power. For example, the gas turbine 106 may generate a gas turbine power output 140; the steam turbine 108 may generate a steam turbine power output 142; and the renewable power generator 110 may generate a renewable power output 144. The gas turbine power output 140, the steam turbine power output 142, and the renewable power output 144 may collectively form the total plant power 102. The total plant power may be provided (e.g., via one or more transmission lines, power distribution units, etc.) to each of the auxiliary devices, the flexible firm skid, and the power grid to meet their respective power demands.

For example, in many embodiments, a first portion 148 of the total plant power 102 may be provided to one or more auxiliary devices 122 to meet an auxiliary demand 149. Additionally, a second portion 150 of the total plant power 102 may be provided to the flexible firm skid 124 to satisfy a flexible firm demand 151. A third portion 156 of the total plant power 102 may be provided (e.g., via the transmission lines 14) to the power grid 105 outside of the power plant 100 to meet a grid demand 153. Notably, the arrows leaving the total plant power 102 and connecting to one of the auxiliary devices 122, the power grid 105, or the flexible firm skid 124, may represent both the power provided to these systems as well as the power demand of these systems (these values are equal as the power demand is the power consumed during operation of the systems).

The flexible firm skid 124 may further include a back up power source 170 that is electrically connected to the containerized demand sink 126 and the one or more power generators 104. The back up power source 170 may not be electrically connected to the power grid 105, such that the back up power source does not produce power that is utilized by the power grid 105. Rather, the back up power source may selectively produce electrical power that may be utilized by the containerized demand sink 126 and/or by the one or more power generators (e.g., for starting the gas turbine 106). The back up power source 170 power output may only be capable of producing a fraction of the power output as the one or more power generators 104 (such as between about 5% and about 20% of the power output of the one or more power generators 104). The back up power source 170 may be an industrial diesel generator, natural gas generator, hydrogen generator, battery bank or other power generator or power storage device.

For example, in many embodiments, an electric motor (EM) 172 may be coupled to the shaft 50 of the gas turbine 108, such that operation of the electric motor 172 causes the shaft 50 of the gas turbine 108 to rotate. In exemplary embodiments, the electric motor 172 may be integrated with the generator 35 (or may be the generator 35 operated in a specific manner). For example, the generator 35 may be powered by a power source to operate in reverse (i.e., as a motor), thereby forceably rotating the shaft 50 of the gas turbine 106. That is, the generator 35 (and/or the electric motor 172) may be electrically coupled to the back up power source 170 (e.g., via one or more power lines or wires). To start the gas turbine 108 with the assistance of the back up power source 170, the back up power source may provide a generator output to the generator 35 (and/or to the electric motor 172), which in turn rotates the shaft 50, and combustion may be initiated in the combustion section 31.

In exemplary embodiments, the gas turbine 106 may include a fuel supply system 174, which may be fluidly coupled to the combustor(s) 30 in the combustion section 31 of the gas turbine 106. The fuel supply system 174 may include one or more storage tanks, supply lines, valves, and/or pumps in order to provide fuel to the combustion section 31 of the gas turbine 106. In many embodiments, the back up power source 170 may also be fluidly coupled to the fuel supply system 174, such that the fuel supply system 174 may be configured to supply fuel to one of (or both) the back up power source 170 and the combustor(s) 30. Additionally, or alternatively, in some embodiments, the back up power source 170 may be fluidly coupled to a standalone fuel supply 176 of the flexible firm skid 124.

Figure 3:
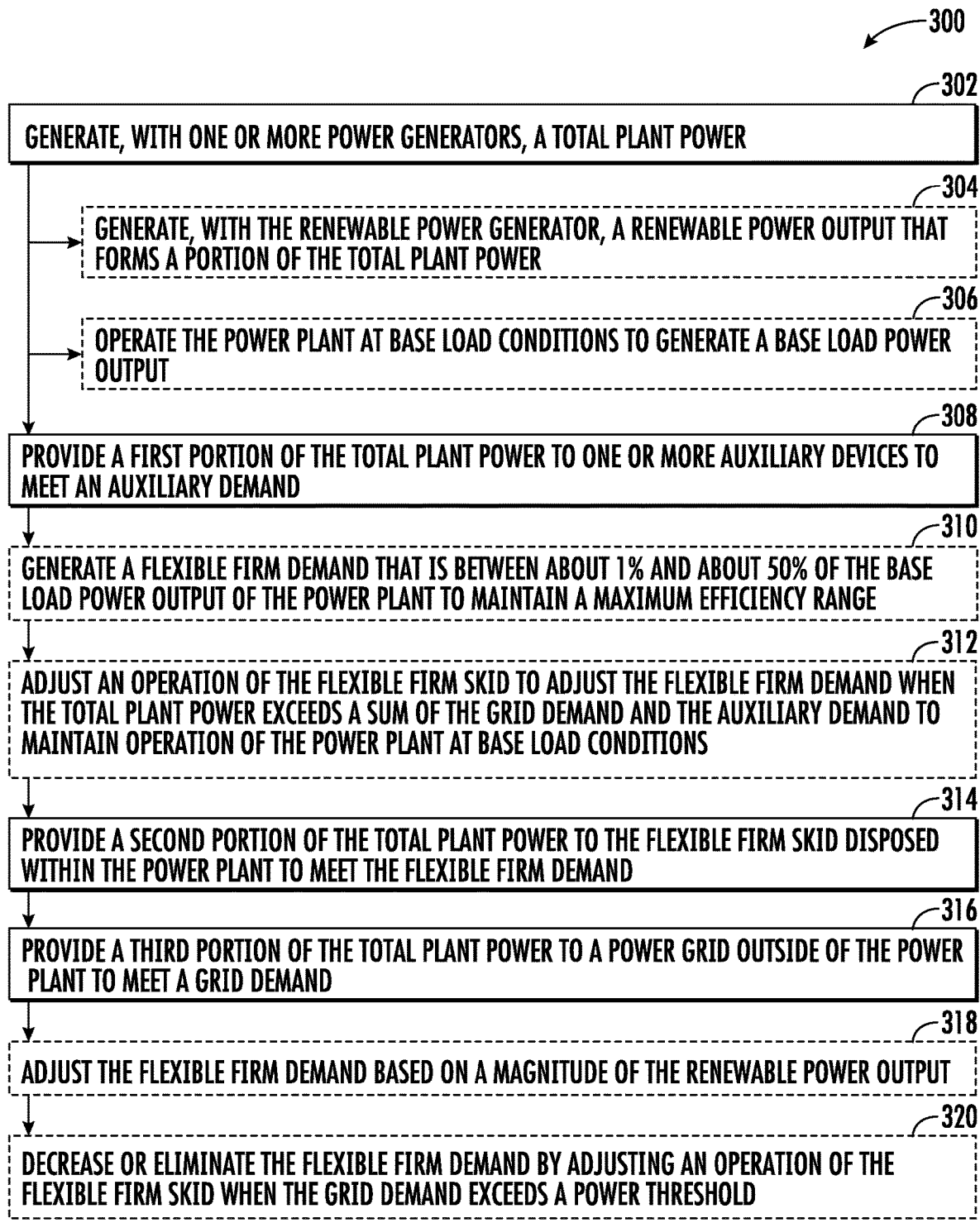
FIG. 3 illustrates a method of operating a power plant having a flexible firm skid in accordance with embodiments of the present disclosure.
Figure 4:
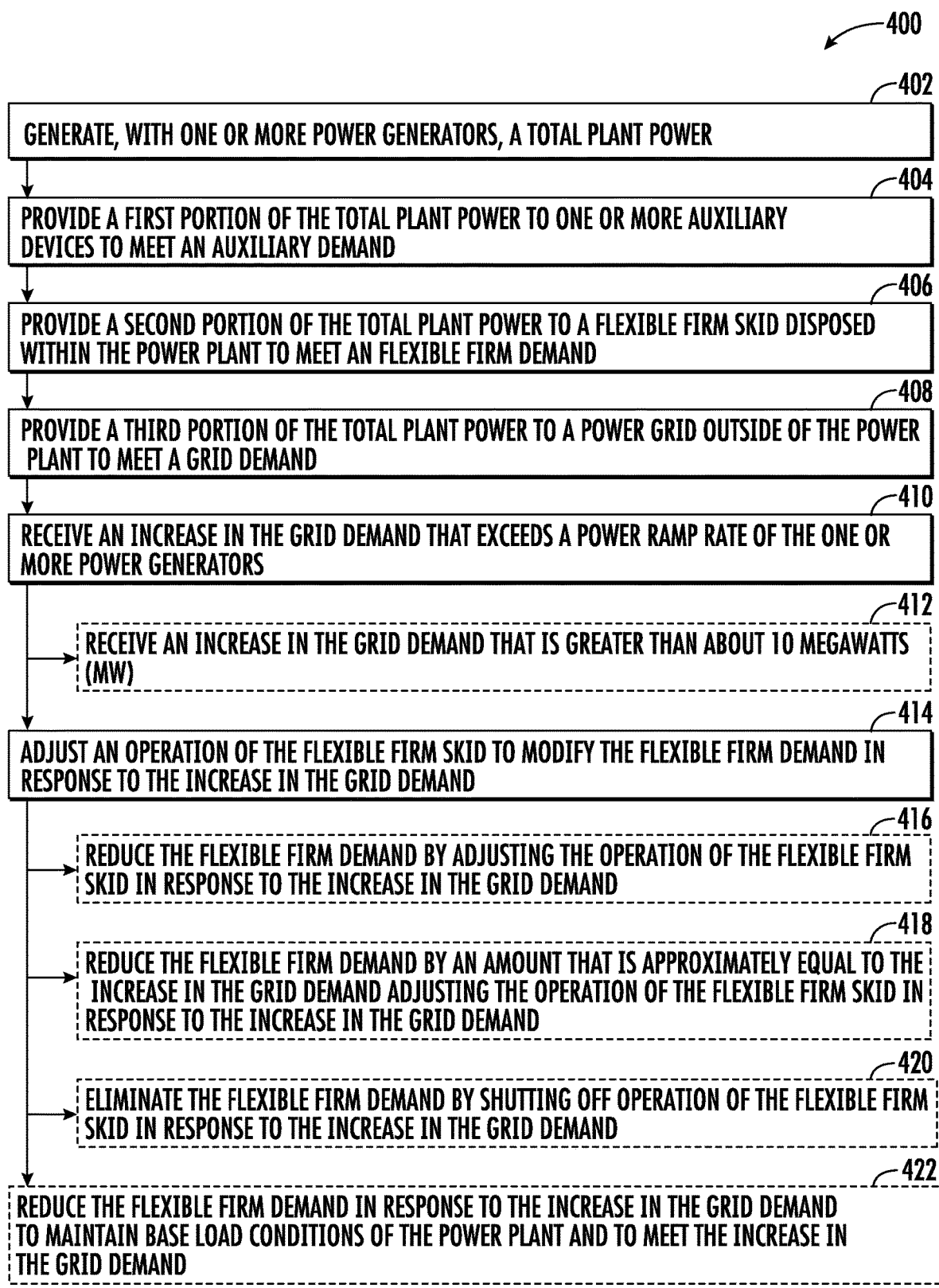
FIG. 4 illustrates a method of operating a power plant having a flexible firm skid in accordance with embodiments of the present disclosure.
Figure 5:
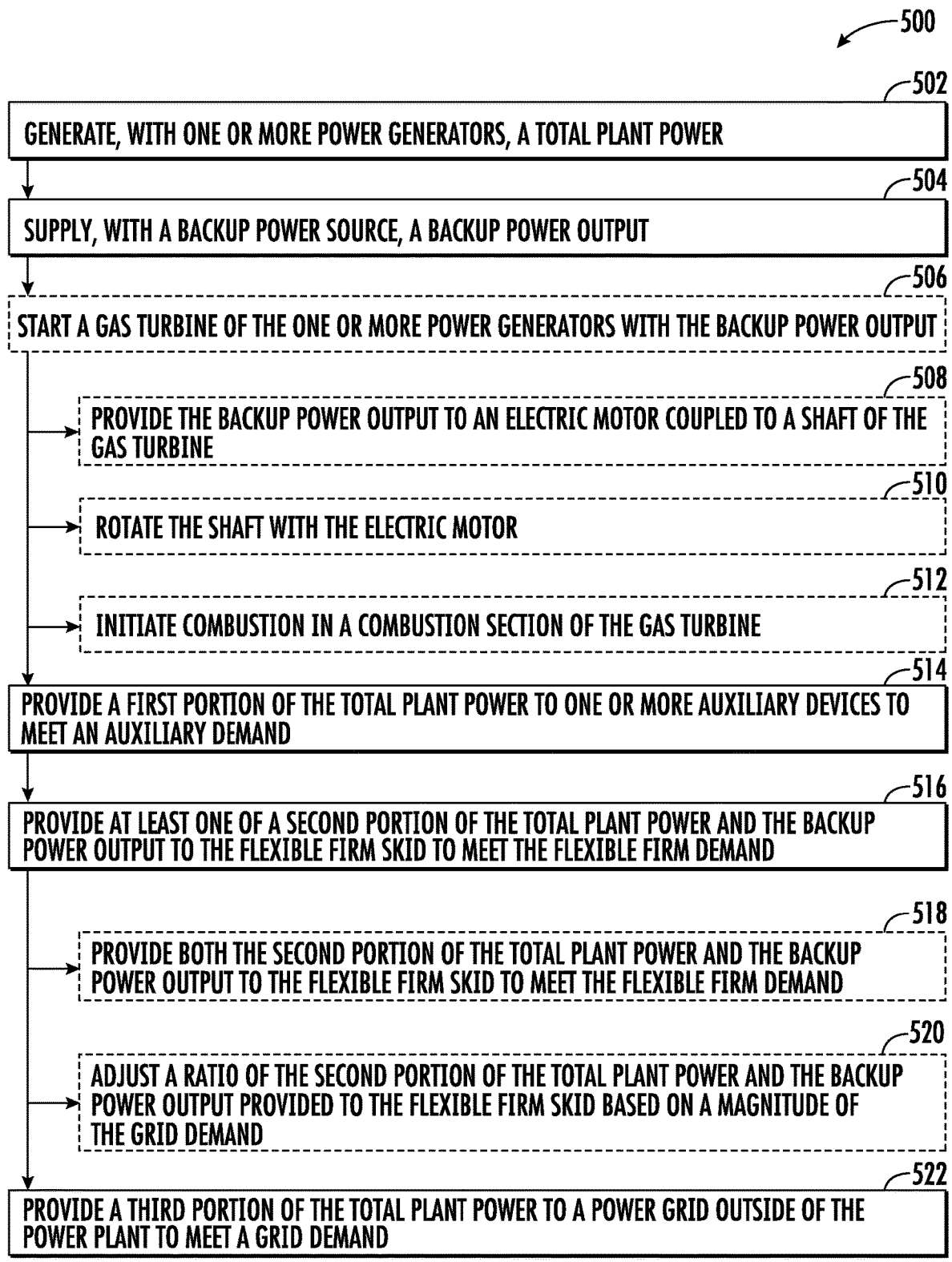
FIG. 5 illustrates a method of operating a power plant having a flexible firm skid in accordance with embodiments of the present disclosure.

FIGS. 3 through 5 each illustrate a flow diagram of one embodiment of a method 300, 400, 500 of operating a power plant in accordance with embodiments of the present subject matter. In general, the methods 300, 400, 500 will be described herein with reference to the power system 10 and the power plant 100 described above with reference to FIGS. 1 and 2. However, it will be appreciated by those of ordinary skill in the art that the disclosed methods 300, 400, 500 may generally be utilized with any suitable power plant or power system and/or may be utilized in connection with a system having any other suitable system configuration. In addition, although FIGS. 3 through 5 each depict steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. Dashed boxes indicate optional steps of the methods 300, 400, 500.

Referring specifically to FIG. 3, In exemplary embodiments, the method 300 may include, at (302), generating, with one or more power generators, a total plant power. The one or more power generators may include thermal power generators (such as a gas turbine and/or a steam turbine) and/or a renewable power generator (such as wind turbines and/or solar panels). The power generators may collectively generate the total plant power. However, in some implementations, only a single power generator (such as a gas turbine) may generate the total plant power. For example, generating at (302) may further include at (304) generating, with the renewable power generator, a renewable power output that forms a portion of the total plant power. This may include harvesting wind energy with a wind turbine or harvesting solar energy with a solar panel. Additionally, as shown, generating at (302) may further include at (306) operating the power plant (e.g., the gas turbine) at base load conditions to generate a base load power output. The power plant may operate within a maximum efficiency range at base load conditions (at which conditions a base load power output is generated). Starting/stopping the gas turbine, operating below base load conditions (e.g., generating a power output that is less than the base load power output), and/or operating above the base load conditions (e.g., generating a power output that is greater than the base load power output) may cause the power plant to fall outside of the maximum efficiency range. The maximum efficiency range may correspond with the most fuel efficient (and/or cost efficient) operation of the gas turbine (and/or the entire power plant). Operation of the power plant within the maximum efficiency range results in the largest ratio of energy generated and energy expended that is possible for the gas turbine. Additionally, base load operation of the power plant results in lower emissions per unit of electricity generated.

In many implementations, the method 300 may include, at (308) providing a first portion of the total plant power to one or more auxiliary devices to meet an auxiliary demand. The auxiliary demand may be generated through operation of the one or more auxiliary devices. In exemplary embodiments, the one or more auxiliary devices being one of thermally, fluidly, or mechanically coupled to the one or more power generators. The auxiliary devices may support operation of the one or more power generators. For example, in embodiments where the one or more power generators includes a gas turbine, the auxiliary devices may include a starting system (such as an electric motor to rotate the shaft), a fuel system, an ignition system, an air intake system, lube oil pumps, a compressor/turbine wash system, a cooling system, or other systems associated with (and/or required for) operation of the gas turbine. The auxiliary owner demand is the electrical power required to operate the various auxiliary devices in the power plant.

In some implementations, the method may include, at (310) generating a flexible firm demand that is between about 1% and about 50% of the base load power output of the power plant to maintain the maximum efficiency range. In other implementations, the flexible firm demand may be between about 10% and about 30% of the base load power output. The flexible firm demand may be generated by operating the flexible firm skid. Additionally, the flexible firm demand may be modified, scaled, or adjusted based on the power output of the other power generators and/or based on the current grid demand. For example, if the grid demand increases (e.g., passes a predetermined threshold), then the flexible firm demand may be decreased (e.g., by either an equivalent amount of the increase in grid demand or only a portion). As another example, if the renewable power generators have an adjusted output (e.g., increased or decreased) due to a change in weather conditions or other factors, the flexible firm demand may be adjusted by the same amount, such that operation of the power plant (e.g., the gas turbine) does not have to be modified (e.g., ramped up or down) from base load conditions.

In various implementations, the method 300 may further include, at (312) adjusting an operation of the flexible firm skid to adjust the flexible firm demand when the total plant power exceeds a sum of the grid demand and the auxiliary demand to maintain operation of the power plant at base load conditions. For example, if there is a change in weather conditions such that the renewable power generators are producing an increased power output, the flexible firm demand may be increased such that the total power output does not exceed the sum of the grid demand and the auxiliary demand.

In exemplary implementations, the method may further include at (314) providing a second portion of the total plant power to the flexible firm skid disposed within the power plant to meet the flexible firm demand. The flexible firm demand may be generated through operation of the flexible firm skid. The flexible firm skid may not be mechanically, thermally, or fluidly coupled to the one or more power generators. That is, the flexible firm skid may operate independently from the one or more power generators, but the flexible firm skid may be powered by the electrical energy generated by the one or more power generators. In exemplary embodiments, the flexible firm skid may include one or more containerized demand sinks having a computing unit (such as a plurality of computing units). Computing units (such as cryptocurrency machines or miners) may be specialized computing systems configured to perform complex mathematical calculations required to validate and secure transactions on a blockchain network, which may generate the flexible firm demand. The computing units may serve the function of performing high load calculations, such as data mining, graphic rendering, machine learning, cryptocurrency mining, blockchain validation, distributed ledger processing, and/or distributed computation. The computing units could use secure hash algorithms such as SHA-0, SHA-1, SHA-2, and SHA-256 (most common in the blockchain space and what most coins use including various cryptocurrencies), and also SHA-512 (a more complex version of SHA-256 with greater theoretical security and ability to withstand brute force attacks), SHA-3, SHA3-256, SHA3-512.

In many embodiments, the containerized demand sink may be movable or easily transportable. For example, the containerized demand sink may be a movable structure that surrounds and contains the digital asset(s). For example, in some embodiments, the housing of the containerized demand sinks may be a shipping container, such as an 8 foot by 8.5 foot by 10 foot shipping container (which may be referred to as a "10 foot shipping container"), or such as an 8 foot by 8.5 foot by 20 foot shipping container (which may be referred to as a "20 foot shipping container"), or such as an 8 by 8.5 by 40 foot shipping container (which may be referred to as a "40 foot shipping container"). In such embodiments, the method 300 may include moving the containerized demand sink from a first location to a second location different than the first location. The first location may be within a power plant, and the second location may be a different location within the power plant. In other implementations, the first location may be within a first power plant, and the second location may be within a second power plant different than the first power plant. In this way, the containerized demand sink may be relocated to different locations within a power plant or to other power plants.

In many implementations, the method 300 may further include, at (316) providing a third portion of the total plant power to a power grid outside of the power plant to meet a grid demand. The grid demand may fluctuate throughout the day (or throughout the week, or throughout the month), and the flexible firm skid may adjust an operation in response to changes in the grid demand to ensure the power plant is able to stay at base load conditions where the maximum efficiency occurs. For example, the method may include at (320) decreasing or eliminating the flexible firm demand by adjusting an operation of the flexible firm skid when the grid demand exceeds a power threshold. For example, in embodiments where the flexible firm skid includes computing units configured to perform high load calculations (such as cryptocurrency mining), the method may include shutting off or turning on all or a portion of the computing units in response to a fluctuation in the grid demand to adjust the flexible firm demand while maintaining base load operation of the gas turbine engine.

In some implementations, the method 300 may further include at (318) adjusting the flexible firm demand based on a magnitude of the renewable power output. For example, the flexible firm demand may be increased or decreased corresponding to increases or decreases in the renewable power output. Particularly, if the renewable power output increases, then the flexible firm demand may also be increased. By contrast, if the renewable power output decreases, then the flexible firm demand may be decreased. Step 318 may be performed while keeping the gas turbine at base load conditions thereby producing the base load power output of the gas turbine (and/or the base load power output of the entire power plant). This makes the total power output robust to weather variations while still allowing for maximum efficiency of the gas turbine.

Referring specifically to FIG. 4, In exemplary embodiments, the method 400 may include, at (402), generating, with one or more power generators, a total plant power. The one or more power generators may include thermal power generators (such as a gas turbine and/or a steam turbine) and/or a renewable power generator (such as wind turbines and/or solar panels). The power generators may collectively generate the total plant power. However, in some implementations, only a single power generator (such as a gas turbine) may generate the total plant power.

In many implementations, the method 400 may include, at (404), providing a first portion of the total plant power to one or more auxiliary devices to meet an auxiliary demand. The auxiliary demand may be generated through operation of the one or more auxiliary devices. In exemplary embodiments, the one or more auxiliary devices being one of thermally, fluidly, or mechanically coupled to the one or more power generators. The auxiliary devices may support operation of the one or more power generators. For example, in embodiments where the one or more power generators includes a gas turbine, the auxiliary devices may include a starting system (such as an electric motor to rotate the shaft), a fuel system, an ignition system, an air intake system, a compressor/turbine wash system, a cooling system, or other systems associated with (and/or required for) operation of the gas turbine. The auxiliary owner demand is the electrical power required to operate the various auxiliary devices in the power plant.

The method 400 may further include, at (406), providing a second portion of the total plant power to the flexible firm skid disposed within the power plant to meet the flexible firm demand. The flexible firm demand may be generated through operation of the flexible firm skid. The flexible firm skid may not be mechanically, thermally, or fluidly coupled to the one or more power generators. That is, the flexible firm skid may operate independently from the one or more power generators, but the flexible firm skid may be powered by the electrical energy generated by the one or more power generators. In exemplary embodiments, the flexible firm skid may include one or more containerized demand sinks having a computing unit (such as a plurality of computing units). Computing units (such as cryptocurrency machines or miners) may be a specialized computing system configured to perform complex mathematical calculations required to validate and secure transactions on a blockchain network, which may generate the flexible firm demand. The computing units may serve the function of performing high load calculations, such as data mining, graphic rendering, machine learning, cryptocurrency mining, blockchain validation, distributed ledger processing, and/or distributed computation. The computing units could use secure hash algorithms such as SHA-0, SHA-1, SHA-2, and SHA-256 (most common in the blockchain space and what most coins use including various cryptocurrencies), and also SHA-512 (a more complex version of SHA-256 with greater theoretical security and ability to withstand brute force attacks), SHA-3, SHA3-256, SHA3-512.

In various embodiments, the method 400 may further include at (408) providing a third portion of the total plant power to a power grid outside of the power plant to meet a grid demand. The grid demand may fluctuate throughout the day (or throughout the week, or throughout the month), and the flexible firm skid may adjust an operation in response to changes in the grid demand. For example, in many implementations, the method may include, at (410), receiving an increase in the grid demand that exceeds a power ramp rate of the one or more power generators. For example, in embodiments where the one or more power generators includes a gas turbine, the gas turbine may ramp between 0% power output and about 100% power output at a power ramp rate of between about 1%/minute and about 15%/minute. Alternatively stated, the gas turbine may ramp between 0% power output and about 100% power output at a power ramp rate of between about 10 MW/minute and about 30 MW/minute, or between about 8% (of rated MW) to about 12% (of rated MW) per minute. As such, receiving at (410) may further include at (412) receiving an increase in the grid demand that is greater than about 10 megawatts (MW), or such as greater than about 15 MW, or such as greater than about 25 MW, or such as greater than about 30 MW. The increase in the grid demand may be due to weather conditions, causing the customers (e.g., customers 16 in FIG. 1) to draw more power.

In exemplary embodiments, the method 400 may further include, at (414), adjusting an operation of the flexible firm skid to modify the flexible firm demand in response to the increase in the grid demand. The flexible firm demand, which may be scaled as necessary depending on how many of the computing units are operational, may be between about 1 MW and about 50 MW (or such as between about 10 MW and about 30 MW). The flexible firm demand may be adjusted (e.g., increased, decreased, or eliminated) within about 0.001 seconds and about 5 seconds by adjusting the number of operating computing units. For example, as discussed above, the flexible firm skid may include a plurality of computing units configured to selectively perform high load calculations (such as cryptocurrency mining or blockchain validation). In such embodiments, adjusting at (414) may include powering off/on one or more computing units of the plurality of computing units, thereby increasing/decreasing flexible firm demand.

In some embodiments, adjusting at (414) may further include at (416) reducing the flexible firm demand by adjusting the operation of the flexible firm skid in response to the increase in the grid demand. For example, the flexible firm demand may be decreased by an equal amount, a lesser amount, or a greater amount as the increase in the grid demand. In many embodiments, adjusting at (414) may include at (418) reducing the flexible firm demand by an amount that is approximately equal (e.g., within ±5%) to the increase in the grid demand adjusting the operation of the flexible firm skid in response to the increase in the grid demand. In another implementation, adjusting at (414) may include at (420) eliminating the flexible firm demand by shutting off operation of the flexible firm skid in response to the increase in the grid demand. For example, in embodiments where the flexible firm skid includes a plurality of computing units, eliminating at (420) may include shutting off all of the computing units simultaneously or at nearly the same time to completely eliminate the flexible firm demand.

In some implementations, the method 400 may include generating a flexible firm demand that is between about 1% and about 50% of the base load power output of the power plant to maintain the maximum efficiency range. In other implementations, the flexible firm demand may be between about 10% and about 30% of the base load power output. The flexible firm demand may be generated by operating the flexible firm skid. Additionally, the flexible firm demand may be modified, scaled, or adjusted based on the power output of the other power generators and/or based on the current grid demand. For example, if the grid demand increases (e.g., passes a predetermined threshold), then the flexible firm demand may be decreased (e.g., by either an equivalent amount of the increase in grid demand or only a portion). As another example, if the renewable power generators have an adjusted output (e.g., increased or decreased) due to a change in weather conditions or other factors, the flexible firm demand may be adjusted by the same amount, such that operation of the gas turbine does not have to be modified (e.g., ramped up or down) form base load conditions.

In many embodiments, the method 400 may further include at (422) reducing the flexible firm demand in response to the increase in the grid demand to maintain base load conditions of the power plant and to meet the increase in the grid demand. For example, the power plant (e.g., the gas turbine and/or the other power generators) may be supported at base load conditions by the flexible firm skid. That is, all or a portion of the base load power output of the power plant may be consumed by the flexible firm skid. As such, reducing the flexible firm demand in response to the increase in grid demand may prevent any modifications or deviations of the power plant (e.g., the gas turbine and/or the other power generators) from base load conditions, thereby maintaining the maximum efficiency range of the power plant, including the gas turbine and the other power generators.

Referring specifically to FIG. 5, In exemplary embodiments, the method 500 may include, at (502), generating, with the one or more power generators, a total plant power. The one or more power generators may include thermal power generators (such as a gas turbine and/or a steam turbine) and/or a renewable power generator (such as wind turbines and/or solar panels). The power generators may collectively generate the total plant power. However, in some implementations, only a single power generator (such as a gas turbine) may generate the total plant power. The one or more power generators may be electrically connected to the power grid to supply power thereto.

In addition to the power generators, the power plant may further include a back up power source, which is not electrically coupled to the power grid but rather electrically coupled to the flexible firm skid and the one or more power generators. The back up power source may be a backup generator (such as a gas generator, diesel generator, or other power generator that converts fuel to energy) or an energy storage system (such as a bank of batteries). The method may include at (504) supplying, with the back up power source, a backup power output. In some embodiments, in which the back up power source is a backup generator (such as a diesel generator, gas generator, or other generator), the method may include generating the backup power output by operating the backup generator. The backup power output may not be provided outside of the power plant (e.g., to the power grid), and the back up power source power output may only be capable of outputting a fraction of the power output as the one or more power generators (such as between about 5% and about 20% of the power output of the one or more power generators). In some embodiments, the back up power source may be an industrial diesel generator, natural gas generator, hydrogen generator, or other power generator. In other embodiments, the backup power source may be an energy storage system, such as a bank of batteries or other large scale (e.g., 10-50 MW) energy storage system.

In many implementations, the method 500 may include at (506) starting a gas turbine of the one or more power generators with the backup power output. For example, an electric motor may be coupled to the shaft of the gas turbine (such that operation of the electric motor rotates the shaft of the gas turbine), and the electric motor may be electrically connected to the back up power source. In such embodiments, the method 500 may include at (508) providing the backup power output to the electric motor coupled to the shaft of the gas turbine. The method 500 may further include at (510) rotating the shaft of the gas turbine with the electric motor, and at (512), initiating combustion in a combustion section of the gas turbine. Initiating combustion may include providing fuel/air to the one or more combustors and igniting the fuel with an ignition source (such as a spark plug or a torch igniter).

In exemplary implementations, the method 500 may further include, at (514), providing a first portion of the total plant power to one or more auxiliary devices to meet an auxiliary demand. The auxiliary demand may be generated through operation of the one or more auxiliary devices. In exemplary embodiments, the one or more auxiliary devices being one of thermally, fluidly, or mechanically coupled to the one or more power generators. The auxiliary devices may support operation of the one or more power generators. For example, in embodiments where the one or more power generators includes a gas turbine, the auxiliary devices may include a starting system (such as an electric motor to rotate the shaft), a fuel system, an ignition system, an air intake system, a compressor/turbine wash system, a pump system, a cooling system, or other systems associated with (and/or required for) operation of the gas turbine. The auxiliary owner demand is the electrical power required to operate the various auxiliary devices in the power plant.

The method 500 may further include, at (516) providing at least one of a second portion of the total plant power and the backup power output to the flexible firm skid to meet the flexible firm demand. For example, the flexible firm demand may be either entirely or partially met by the backup power output. In many implementations, the flexible firm demand may be met by both a portion of the total plant power and the backup power output. For example, in such implementations, the method 500 may include at (518) providing both the second portion of the total plant power and the backup power output to the flexible firm skid to meet the flexible firm demand. The ratio of the second portion of the total power and the backup power output provided to the flexible firm skid to meet the flexible firm skid may selectively vary. In some implementations, the method 500 may further include at (520) adjusting the ratio of the second portion of the total plant power and the backup power output provided to the flexible firm skid based on a magnitude of the grid demand. For example, if the grid demand is large (e.g., greater than a first predetermined power threshold) then the flexible firm skid may be powered entirely by the backup power output. In another example, if the grid demand is less than the first predetermined power threshold but greater than a second predetermined power threshold, then the flexible firm skid may be powered by both the backup power output and the second portion of the total power output. In yet another example, if the grid demand is less than both the first predetermined power threshold and the second predetermined power threshold, then the flexible firm skid may be powered entirely by the backup power output.

In exemplary implementations, the method 500 may further include at (522) providing a third portion of the total plant power to a power grid outside of the power plant to meet a grid demand. The grid demand may fluctuate throughout the day (or throughout the week, or throughout the month), and the flexible firm skid may adjust an operation in response to changes in the grid demand to ensure the power plant is able to stay at base load conditions where the maximum efficiency occurs.

Figure 6:
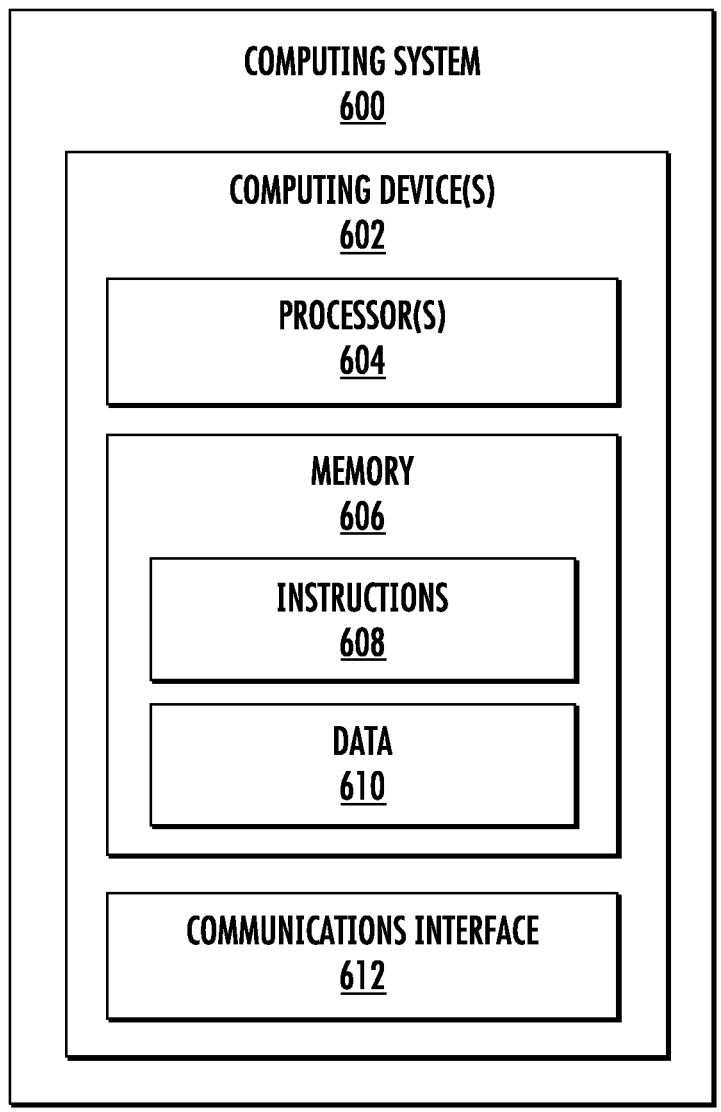
FIG. 6 illustrates a block diagram of a controller in accordance with one or more aspects of the present disclosure.

FIG. 6 provides a block diagram of an example computing system 600. The computing system 600 can be used to implement the aspects disclosed herein. The computing system 600 can include one or more computing device(s) 602. The controllers 22, 23, 40, 116, 118, 120, 125 described above with reference to FIGS. 1 and 2 may each be constructed and may operate in a same or similar manner as one of the computing devices 602, for example.

As shown in FIG. 6, the one or more computing device(s) 602 can each include one or more processor(s) 604 and one or more memory device(s) 606. The one or more processor (s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm (s), model(s), equation(s), etc. according to example embodiments of the present disclosure.

The one or more computing device(s) 602 can also include a communication interface 612 used to communicate, for example, with the other components of the power plant 100 or other controllers. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a power plant, the method comprising: generating, with one or more power generators, a total plant power; providing a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators; providing a second portion of the total plant power to a flexible firm skid disposed within the power plant to meet a flexible firm demand, the flexible firm demand being generated through operation of the flexible firm skid; and providing a third portion of the total plant power to a power grid outside of the power plant to meet a grid demand.

The method as in any preceding clause, wherein the flexible firm skid is not mechanically, thermally, or fluidly coupled to the one or more power generators.

The method as in any preceding clause, wherein the power plant operates within a maximum efficiency range at base load conditions, wherein the power plant generates a base load power output at the base load conditions, and wherein the method further comprises: generating a flexible firm demand that is between about 1% and about 50% of the base load power output of the power plant to maintain the maximum efficiency range.

The method as in any preceding clause, wherein the flexible firm skid includes a containerized demand sink having a digital asset disposed within a housing.

The method as in any preceding clause, further comprising: moving the containerized demand sink from a first location to a second location that is different than the first location.

The method as in any preceding clause, wherein the digital asset comprises at least one of data centers, digital factory equipment, and computing units.

The method as in any preceding clause, further comprising: operating the containerized demand sink within a proximity of about 0 meters and about 500 meters of the one or more power generators.

The method as in any preceding clause, wherein the one or more power generators includes a renewable power generator, and wherein the method further comprises: generating, with the renewable power generator, a renewable power output that forms a portion of the total plant power; and adjusting the flexible firm demand based on a magnitude of the renewable power output.

The method as in any preceding clause, wherein the power plant operates within a maximum efficiency range at base load conditions, and wherein the method further comprises: operating the power plant at base load conditions;

and adjusting an operation of the flexible firm skid to adjust the flexible firm demand when the total plant power exceeds a sum of the grid demand and the auxiliary demand to maintain operation of the power plant at base load conditions.

The method as in any preceding clause, wherein the method further comprises: decreasing or eliminating the flexible firm demand by adjusting an operation of the flexible firm skid when the grid demand exceeds a power threshold.

A power plant comprising: one or more power generators; one or more auxiliary devices mechanically, thermally, or fluidly coupled to the one or more power generators and disposed within the power plant system, the one or more auxiliary devices configured to generate an auxiliary demand; a flexible firm skid disposed within the power plant system, the flexible firm skid configured to generate a flexible firm demand; a controller operably connected to the one or more power generators, the one or more auxiliary devices, and the flexible firm skid, the controller including memory and one or more processors, the memory storing instructions that when executed by the one or more processors cause the power plant to perform one or more operations including the following: generate, with one or more power generators, a total plant power; provide a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators; provide a second portion of the total plant power to a flexible firm skid disposed within the power plant to meet an flexible firm demand, the flexible firm demand being generated through operation of the flexible firm skid; and providing a third portion of the total plant power to a power grid outside of the power plant.

The power plant as in any preceding clause, wherein the flexible firm skid is not mechanically, thermally, or fluidly coupled to the one or more power generators.

The power plant as in any preceding clause, wherein power plant operates within a maximum efficiency range at base load conditions, wherein power plant generates a base load power output at the base load conditions, and wherein one or more operations further comprises: generating a flexible firm demand that is between about 1% and about 50% of the base load power output of the power plant to maintain the maximum efficiency range.

The power plant as in any preceding clause, wherein the flexible firm skid includes a containerized demand sink having a digital asset disposed within a housing.

The power plant as in any preceding clause, wherein the digital asset comprises at least one of data centers, digital factory equipment, and computing units.

The power plant as in any preceding clause, wherein the containerized demand sink is disposed within a proximity of about 0 meters and about 500 meters of the one or more power generators.

The power plant as in any preceding clause, wherein the one or more power generators includes a renewable power generator, and wherein the one or more operations further comprises: generate, with the renewable power generator, a renewable power output wherein the renewable power output forms a portion of the total plant power; and adjust the flexible firm demand based on a magnitude of the renewable power output.

The power plant as in any preceding clause, wherein the power plant operates within a maximum efficiency range at base load conditions, and wherein one or more operations further comprises: operate the power plant at base load conditions to generate a base load power output; adjust an operation of the flexible firm skid to adjust the flexible firm demand when the total plant power exceeds a sum of the grid demand and the auxiliary demand to maintain operation of the power plant at base load conditions.

The power plant as in any preceding clause, wherein when the grid demand exceeds a power threshold, the one or more operations include: decrease or eliminating the flexible firm demand by adjusting an operation of the flexible firm skid.

A method of operating a power plant, the method comprising: generating, with one or more power generators, a total plant power; providing a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators; providing a second portion of the total plant power to a flexible firm skid disposed within the power plant to meet a flexible firm demand, the flexible firm demand being generated through operation of the flexible firm skid; and providing a third portion of the total plant power to a power grid outside of the power plant to meet a grid demand; receiving an increase in the grid demand that exceeds a power ramp rate of the one or more power generators; and adjusting an operation of the flexible firm skid to modify the flexible firm demand in response to the increase in the grid demand.

The method as in any preceding clause, wherein receiving an increase in the grid demand further comprises: receiving an increase in the grid demand that is greater than about 10 megawatts (MW).

The method as in any preceding clause, wherein the one or more power generators comprises a gas turbine, and wherein the power ramp rate of the gas turbine is between about 10 megawatts per minute (MW/min) and about 60 MW/min.

The method as in any preceding clause, wherein the one or more power generators comprises a gas turbine having a maximum rated power output, and wherein the power ramp rate of the gas turbine is between about 8% per minute of the maximum rated power output and about 12% per minute of the maximum rated power output.

The method as in any preceding clause, wherein adjusting an operation of the flexible firm skid further comprises: reducing the flexible firm demand by adjusting the operation of the flexible firm skid in response to the increase in the grid demand.

The method as in any preceding clause, wherein adjusting an operation of the flexible firm skid further comprises: reducing the flexible firm demand by an amount that is approximately equal to the increase in the grid demand adjusting the operation of the flexible firm skid in response to the increase in the grid demand.

The method as in any preceding clause, wherein adjusting an operation of the flexible firm skid further comprises: eliminating the flexible firm demand by shutting off operation of the flexible firm skid in response to the increase in the grid demand.

The method as in any preceding clause, wherein the power plant operates within a maximum efficiency range at base load conditions, wherein the power plant generates a base load power output at the base load conditions, and wherein the method further comprises: generating a flexible firm demand that is between about 1% and about 50% of the base load power output of the power plant to maintain the maximum efficiency range.

The method as in any preceding clause, further comprising: reducing the flexible firm demand in response to the increase in the grid demand to maintain base load conditions of the power plant and to meet the increase in the grid demand.

The method as in any preceding clause, wherein the flexible firm skid includes a containerized demand sink having a digital asset disposed within a housing.

A power plant comprising: a power generator; one or more auxiliary devices that is at least one of mechanically, thermally, or fluidly coupled to the one or more power generators, the one or more auxiliary devices configured to generate an auxiliary demand; a flexible firm skid disposed within the power plant, the flexible firm skid configured to generate a flexible firm demand; a controller operably connected to the one or more thermal power generators, the one or more auxiliary devices, and the flexible firm skid, the controller including memory and one or more processors, the memory storing instructions that when executed by the one or more processors cause the power plant to perform one or more operations including the following: generate, with the one or more power generators, a total plant power; provide a first portion of the total plant power to the one or more auxiliary devices to meet an auxiliary demand; provide a second portion of the total plant power to a flexible firm skid disposed within the power plant to meet the flexible firm demand; and provide a third portion of the total plant power to a power grid outside of the power plant to meet a grid demand; receive an increase in the grid demand that exceeds a power ramp rate of the one or more power generators; and adjust an operation of the flexible firm skid to modify the flexible firm demand in response to the increase in the grid demand.

The power plant as in any preceding clause, wherein in receiving the increase in the grid demand, the one or more operations further include: receive an increase in the grid demand that is greater than about 10 megawatts (MW).

The power plant as in any preceding clause, wherein the one or more power generators comprises a gas turbine, and wherein the power ramp rate of the gas turbine is between about 10 megawatts per minute (MW/min) and about 60 MW/min.

The power plant as in any preceding clause, wherein in adjusting an operation of the flexible firm skid, the one or more operations further include: reduce the flexible firm demand by adjusting the operation of the flexible firm skid in response to the increase in the grid demand.

The power plant as in any preceding clause, in adjusting an operation of the flexible firm skid, the one or more operations further include: reduce the flexible firm demand by an amount that is approximately equal to the increase in the grid demand adjusting the operation of the flexible firm skid in response to the increase in the grid demand.

The power plant as in any preceding clause, wherein in adjusting an operation of the flexible firm skid, the one or more operations further include: eliminate the flexible firm demand by shutting off operation of the flexible firm skid in response to the increase in the grid demand.

The power plant as in any preceding clause, wherein the power plant operates within a maximum efficiency range at base load conditions, wherein power plant generates a base load power output at the base load conditions, and wherein the one or more operations include: generating a flexible firm demand that is between about 1% and about 50% of the base load power output of the power plant to maintain the maximum efficiency range.

The power plant as in any preceding clause, wherein the flexible firm skid includes a containerized demand sink having a digital asset disposed within a housing.

The power plant as in any preceding clause, wherein the digital asset comprises at least one of data centers, digital factory equipment, and computing units.

The power plant as in any preceding clause, wherein the containerized demand sink is disposed within a proximity of about 0 meters and about 500 meters of the one or more thermal power generators.

A method of operating a power plant, the method comprising: generating, with the one or more power generators, a total plant power; supplying, with a back up power source, a backup power output; providing a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators; providing at least one of a second portion of the total plant power and the backup power output to the flexible firm skid to meet the flexible firm demand, the flexible firm demand being generated through operation of the flexible firm skid; and providing a third portion of the total plant power to a power grid outside of the power plant to meet a grid demand.

The method as in any preceding clause, wherein providing at least one of the second portion and the backup power output further comprises: providing both the second portion of the total plant power and the backup power output to the flexible firm skid to meet the flexible firm demand.

The method as in any preceding clause, further comprising: adjusting a ratio of the second portion of the total plant power and the backup power output provided to the flexible firm skid based on a magnitude of the grid demand.

The method as in any preceding clause, wherein the one or more power generators comprises a gas turbine, and wherein the method further comprises: starting the gas turbine at least partially with the backup power output.

The method as in any preceding clause, wherein starting the gas turbine at least partially with the backup power output further comprises: providing the backup power output to an electric motor coupled to a shaft of the gas turbine; rotating the shaft with the electric motor; and initiating combustion in a combustion section of the gas turbine.

The method as in any preceding clause, wherein the combustion section of the gas turbine is fluidly coupled to a fuel supply, and wherein the back up power source is fluidly coupled to the fuel supply.

The method as in any preceding clause, wherein the flexible firm skid includes a containerized demand sink having a digital asset disposed within a housing, and wherein the digital asset comprises at least one of data centers, digital factory equipment, and computing units.

The method as in any preceding clause, wherein the containerized demand sinks are disposed within a proximity of about 0 meters and about 500 meters of the gas turbine.

A power plant comprising: one or more power generators electrically connected to a power grid; one or more auxiliary devices that is at least one of mechanically, thermally, or fluidly coupled to the one or more power generators, the one or more auxiliary devices configured to generate an auxiliary demand; a flexible firm skid disposed within the power plant, the flexible firm skid including a containerized demand sink and a back up power source electrically connected to the containerized demand sink and the one or more power generators, the flexible firm skid configured to generate a flexible firm demand; and a controller operably connected to the gas turbine and the flexible firm skid, the controller including memory and one or more processors, the memory storing instructions that when executed by the one or more processors cause the power plant to perform one or more operations including the following: generate, with the one or more power generators, a total plant power; supply, with the back up power source, a backup power output; provide a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators; provide at least one of a second portion of the total plant power and the backup power output to the flexible firm skid to meet the flexible firm demand, the flexible firm demand being generated through operation of the flexible firm skid; and provide a third portion of the total plant power to a power grid outside of the power plant to meet a grid demand.

The power plant as in any preceding clause, wherein the one or more power generators comprises a gas turbine, and wherein the one or more operations further include: start the gas turbine at least partially with the backup power output.

The power plant as in any preceding clause, wherein in starting the gas turbine at least partially with the backup power output, the one or more operations further include: provide the backup power output to an electric motor coupled to a shaft of the gas turbine; rotate the shaft with the electric motor; and initiate combustion in a combustion section of the gas turbine.

The power plant as in any preceding clause, wherein the combustion section of the gas turbine is fluidly coupled to a fuel supply system, and wherein the back up power source is fluidly coupled to the fuel supply system.

The power plant as in any preceding clause, wherein the back up power source is fluidly coupled to a standalone fuel supply.

The power plant as in any preceding clause, wherein the flexible firm skid includes a containerized demand sink having a digital asset disposed within a housing.

The power plant as in any preceding clause, wherein the digital asset comprises at least one of data centers, digital factory equipment, and computing units.

The power plant as in any preceding clause, wherein the containerized demand sinks are disposed within a proximity of about 0 meters and about 500 meters of the gas turbine.

The power plant as in any preceding clause, wherein in providing at least one of the second portion and the backup power output, the one or more operations further comprises: provide both the second portion of the total plant power and the backup power output to the flexible firm skid to meet the flexible firm demand.

The power plant as in any preceding clause, wherein the one or more operations include: adjust a ratio of the second portion of the total plant power and the backup power output provided to the flexible firm skid based on a magnitude of the grid demand.

What is claimed is:

1. A method of operating a power plant, the method comprising:
   generating, with one or more power generators, a total plant power;
   supplying, with a back up power source, a backup power output;
   providing a first portion of the total plant power to one or more auxiliary devices to meet an auxiliary demand, the auxiliary demand being generated through operation of the one or more auxiliary devices, the one or more auxiliary devices being one of thermally, fluidly, or mechanically coupled to the one or more power generators;
   providing at least one of a second portion of the total plant power and the backup power output to a flexible firm skid to meet a flexible firm power demand, the flexible firm skid including one or more digital assets configured to generate the flexible firm power demand through operation of the one or more digital assets;
   providing a third portion of the total plant power to a power grid outside of the power plant to meet a grid demand;
   comparing a magnitude of the grid demand to one or more power thresholds; and
   adjusting a ratio of the second portion of the total plant power and the backup power output used to meet the flexible firm power demand based on the comparison.

2. The method as in claim 1, wherein providing at least one of the second portion and the backup power output further comprises:
   providing both the second portion of the total plant power and the backup power output to the flexible firm skid to meet the flexible firm power demand.

3. The method as in claim 1, wherein the one or more power generators comprises a gas turbine, and wherein the method further comprises:
   starting the gas turbine at least partially with the backup power output.

4. The method as in claim 3, wherein starting the gas turbine at least partially with the backup power output further comprises:
   providing the backup power output to an electric motor coupled to a shaft of the gas turbine;
   rotating the shaft with the electric motor; and
   initiating combustion in a combustion section of the gas turbine.

5. The method as in claim 4, wherein the combustion section of the gas turbine is fluidly coupled to a fuel supply, and wherein the back up power source is fluidly coupled to the fuel supply.

6. The method as in claim 1, wherein the flexible firm skid includes a containerized demand sink having the one or more digital assets disposed within a housing, and wherein the one or more digital assets comprises at least one of data centers, digital factory equipment, and computing units.

7. The method as in claim 6, wherein the containerized demand sinks are disposed within a proximity of 0 meters and 500 meters of the one or more power generators.

8. The method as in claim 1, further comprising:
   receiving an increase in the grid demand that exceeds a power ramp rate of the one or more power generators;
   adjusting an operation of the flexible firm skid to modify the flexible firm demand in response to the increase in the grid demand; and
   reducing the flexible firm demand by an amount that is approximately equal to the increase in the grid demand to adjust the operation of the flexible firm skid in response to the increase in the grid demand.

9. A power plant comprising:
   one or more power generators electrically connected to a power grid outside of the power plant;

one or more auxiliary devices that is at least one of mechanically, thermally, or fluidly coupled to the one or more power generators, the one or more auxiliary devices configured to generate an auxiliary demand;

a flexible firm skid disposed within the power plant, the flexible firm skid including a containerized demand sink and a back up power source electrically connected to the containerized demand sink and the one or more power generators, the flexible firm skid including one or more digital assets configured to generate a flexible firm power demand through operation of the one or more digital assets; and a controller operably connected to the one or more power generators and the flexible firm skid, the controller including memory and one or more processors, the memory storing instructions that when executed by the one or more processors cause the power plant to perform operations including the following:

generate, with the one or more power generators, a total plant power;

supply, with the back up power source, a backup power output;

provide a first portion of the total plant power to the one or more auxiliary devices to meet the auxiliary demand;

provide at least one of a second portion of the total plant power and the backup power output to the flexible firm skid to meet the flexible firm power demand, the flexible firm power demand being generated through operation of the flexible firm skid;

provide a third portion of the total plant power to the power grid to meet a grid demand;

compare a magnitude of the grid demand to one or more power thresholds; and adjust a ratio of the second portion of the total plant power and the backup power output used to meet the flexible firm power demand based on the comparison.

10. The power plant as in claim 9, wherein the one or more power generators comprises a gas turbine, and wherein the operations further include:

start the gas turbine at least partially with the backup power output.

11. The power plant as in claim 10, wherein in starting the gas turbine at least partially with the backup power output, the operations further include:

provide the backup power output to an electric motor coupled to a shaft of the gas turbine;

rotate the shaft with the electric motor; and initiate combustion in a combustion section of the gas turbine.

12. The power plant as in claim 11, wherein the combustion section of the gas turbine is fluidly coupled to a fuel supply system, and wherein the back up power source is fluidly coupled to the fuel supply system.

13. The power plant as in claim 9, wherein the back up power source is fluidly coupled to a standalone fuel supply.

14. The power plant as in claim 9, wherein the flexible firm skid includes the containerized demand sink having the one or more digital assets disposed within a housing.

15. The power plant as in claim 14, wherein the one or more digital assets comprises at least one of data centers, digital factory equipment, and computing units.

16. The power plant as in claim 14, wherein the containerized demand sinks are disposed within a proximity of 0 meters and 500 meters of the one or more power generators.

17. The power plant as in claim 9, wherein in providing at least one of the second portion and the backup power output, the operations further comprise:

provide both the second portion of the total plant power and the backup power output to the flexible firm skid to meet the flexible firm power demand.

* * * * *